US008543031B2

(12) United States Patent
Pietrantoni et al.

(10) Patent No.: US 8,543,031 B2
(45) Date of Patent: Sep. 24, 2013

(54) INTERMEDIATE TRANSFER MEMBER RECONDITIONING

(75) Inventors: Dante M. Pietrantoni, Rochester, NY (US); Yuhua Tong, Webster, NY (US); Jin Wu, Pittsford, NY (US); Frank Mezzatesta, Penfield, NY (US); Jeremy J. Bean, Rochester, NY (US); Heiko Rommelmann, Penfield, NY (US); Jonathan H. Herko, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 477 days.

(21) Appl. No.: 12/958,517

(22) Filed: Dec. 2, 2010

(65) Prior Publication Data

US 2012/0141157 A1 Jun. 7, 2012

(51) Int. Cl.
*G03G 15/00* (2006.01)
*B21D 53/00* (2006.01)
*B23P 6/00* (2006.01)

(52) U.S. Cl.
USPC ..... 399/109; 29/895.1; 29/402.06; 29/402.18

(58) Field of Classification Search
USPC ................ 399/109; 29/895.1, 895.3, 402.01, 29/402.03, 402.04, 402.06, 402.09, 402.18, 29/402.21
See application file for complete search history.

(56) References Cited

U.S. PATENT DOCUMENTS

| | | | | |
|---|---|---|---|---|
| 6,044,243 | A * | 3/2000 | Hara | 399/302 |
| 6,118,968 | A * | 9/2000 | Schlueter et al. | 399/333 |
| 7,392,586 | B2 * | 7/2008 | Tsukada et al. | 29/895.3 |
| 8,257,892 | B2 * | 9/2012 | Wu et al. | 430/65 |
| 2003/0067528 | A1 * | 4/2003 | Chowdry et al. | 347/103 |
| 2011/0024024 | A1 * | 2/2011 | Pietrantoni et al. | 156/137 |
| 2011/0042856 | A1 * | 2/2011 | Aoto et al. | 264/334 |

* cited by examiner

*Primary Examiner* — Walter L Lindsay, Jr.
*Assistant Examiner* — Rodney Bonnette
(74) *Attorney, Agent, or Firm* — Hoffman Warnick LLC

(57) ABSTRACT

There is disclosed a method for reconditioning an intermediate transfer member and the reconditioned intermediate transfer member. The method comprises stripping off an outer layer of the intermediate transfer member. A mixture of a polymer, conductive particles and a solvent is coated over the outer surface of a seamless intermediate transfer member. The mixture is heated to form a layer on the outer surface of the intermediate transfer belt. An apparatus for reconditioning an intermediate transfer member is also described.

20 Claims, 3 Drawing Sheets

INTERMEDIATE TRANSFER MEMBER RECONDITIONING

BACKGROUND

1. Field of Use

This disclosure is directed to an image-forming apparatus and an intermediate transfer member.

2. Background

Image-forming apparatuses in which a color or black and white image is formed by using an intermediate transfer member to electrostatically transfer toner are well known. When an image is formed on a sheet of paper in a color image-forming apparatus using such an intermediate transfer member, four color images in yellow, magenta, cyan and black respectively are generally first transferred sequentially from an image carrier such as a photoreceptor and superimposed on the intermediate transfer member (the primary transfer). This full color image is then transferred to a sheet of paper in a single step (the secondary transfer). In a black and white image-forming apparatus, a black image is transferred from the photoreceptor, superimposed on an intermediate transfer member, and then transferred to a sheet of paper.

Certain intermediate transfer members are in the form of seamless belts. These intermediate transfer belts (ITBs) are costly to manufacture; however, seamless belts are advantageous in that such belts reduce print cycle time. The high cost of these belts is especially true with large pitch belts, where more expensive polyimide type polymers are required. It would be desirable to be able to remanufacture seamless ITBs so that useful life of the seamless ITBs can be extended. Such remanufacturing requires the properties of the seamless ITB to meet the requirements of a new seamless ITB.

SUMMARY

According to various embodiments there is described a method for reconditioning an intermediate transfer member. The outer layer of the intermediate transfer member is stripped with an alcohol. A mixture of a polymer, conductive particles and a solvent is coated over the outer surface of a seamless intermediate transfer member. The mixture is heated to form a layer on the outer surface of the intermediate transfer belt.

According to various embodiments, there is disclosed an apparatus for reconditioning an intermediate transfer belt. The apparatus includes a drive mechanism for rotating and tensioning an intermediate transfer belt. A flow coating dispensing member for applying to the intermediate transfer belt an overcoat solution is positioned flow coating dispensing member is movable both parallel and perpendicular to a direction of rotation of the intermediate transfer belt.

According to various embodiments there is disclosed a method for reconditioning an intermediate transfer member. The outer surface of the intermediate transfer member is stripped or its outer layer with an alcohol. A mixture of polyvinylidene fluoride, conductive particles and a solvent is coated over the outer surface of a seamless intermediate transfer member. The mixture is heated to form a surface layer on the outer surface of the intermediate transfer belt wherein the surface layer comprises a thickness of from about 10 microns to about 150 microns and a surface resistivity of from about $10^9$ ohms/square to about $10^{13}$ ohms/square.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
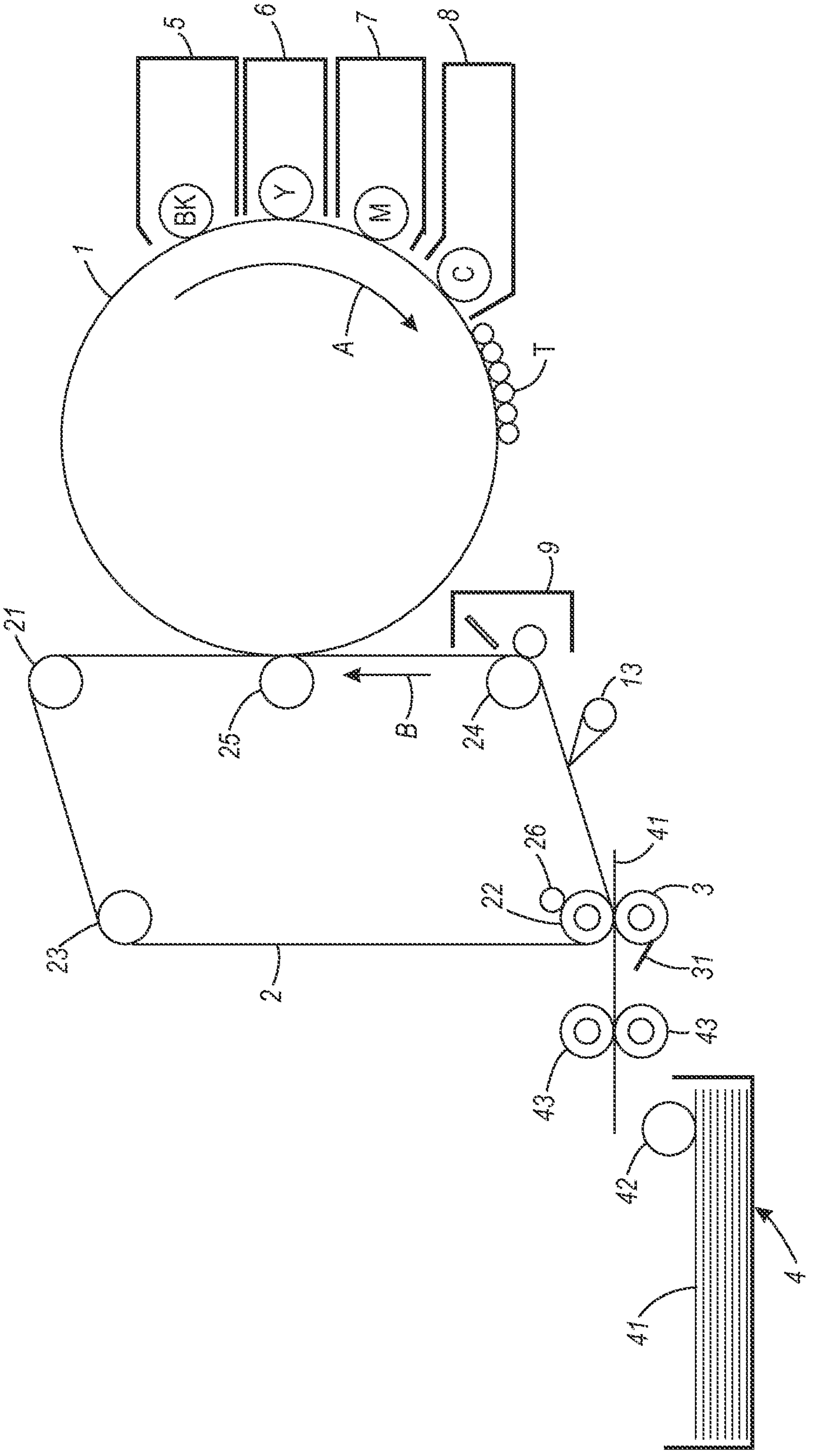
FIG. 1 is a schematic illustration of an image apparatus.

Referring to FIG. 1, an image-forming apparatus includes an intermediate transfer member as described in more detail below. The image-forming apparatus is an image-forming apparatus of an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also in the image-forming apparatus, the intermediate transfer member may be provided as a transfer-conveying member for conveying the transfer material in the transfer region for transferring the toner image onto the transfer material. Having the intermediate transfer member that transfers images of high quality and that remains stable for a long period is required.

The image-forming apparatus described herein is not particularly limited as far as it is an image-forming apparatus of intermediate transfer type, and examples include an ordinary monochromatic image-forming apparatus accommodating only a monochromatic color in the developing device, a color image-forming apparatus for repeating primary transfer of the toner image carried on the image carrier sequentially on the intermediate transfer member, and a tandem color image-forming apparatus having plural image carriers with developing units of each color disposed in series on the intermediate transfer member. More specifically, it may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and others by known methods as required.

As the image carrier, a known one may be used. As its photosensitive layer, an organic system, amorphous silicon, or other known material may be used. In the case of the image carrier of cylindrical type, it is obtained by a known method of molding aluminum or aluminum alloy by extrusion, and processing the surface. A belt form image carrier may also be used.

The charging unit is not particularly limited, and known chargers may be used, such as a contact type charger using a conductive or semiconductive roller, brush, film and rubber blade, scorotron charger or corotron charge making use of corona discharge, and others. Above all, the contact type charging unit has excellent charge compensation capability. The charging unit usually applies DC current to the electrophotographic photosensitive material, but AC current may be further superposed.

The exposure unit is not particularly limited, and, for example, an optical system device may be used, which exposes a desired image on the surface of the electrophotographic photosensitive material by using a light source such as a semiconductor laser beam, LED beam, liquid crystal shutter beam or the like, or through a polygonal mirror from such light source.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using a member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used together.

The second transfer unit may be same as the first transfer unit such as a contact type transfer charger using a transfer roller and others, scorotron transfer charger and corotron transfer charger. By pressing firmly by the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be done.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as a heat roller fixing unit and an oven fixing unit.

The cleaning unit is not particularly limited, and any known cleaning device may be used.

A color image-forming apparatus for repeating primary transfer is shown schematically in FIG. 1. The image-forming apparatus shown in FIG. 1 includes a photosensitive drum 1 as an image carrier, a transfer member 2 as an intermediate transfer member such as a transfer belt, a bias roller 3 as a transfer electrode, a tray 4 for feeding paper as transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and a feed roller 43.

In the image-forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the transfer member 2, and the primary transfer is executed by rotation of the transfer member 2 in the direction of arrow B.

Similarly, a toner image of a second color, a toner image of a third color and a toner image of a fourth color are sequentially formed, and overlaid on the transfer member 2, and a multi-layer toner image is formed.

The multi-layer toner image transferred on the transfer member 2 is brought to the secondary transfer unit comprising the bias roller 3 by rotation of the transfer member 2. The secondary transfer unit comprises the bias roller 3 disposed at the surface side carrying the toner image of the transfer member 2, backup roller 22 disposed to face the bias roller 3 from the back side of the transfer member 2, and electrode roller 26 rotating in tight contact with backup roller 22.

The paper 41 is taken out one by one from the paper block accommodated in the paper tray 4 by means of the pickup roller 42, and is fed into the space between the transfer member 2 and bias roller 3 of the secondary transfer unit by means of the feed roller 43 at a specified timing. The fed paper 41 is conveyed under pressure between the bias roller 3 and backup roller 22, and the toner image carried on the transfer member 2 is transferred thereon by rotation of the transfer member 2.

The paper 41 on which the toner image is transferred, is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31 made of polyurethane or the like may be always in contact, and toner particles, paper dust and other foreign matter sticking by transfer are removed.

In the case of transfer of a monochromatic image, the toner image T after primary transfer is immediately sent to the secondary transfer process, and is conveyed to the fixing device, but in the case of transfer of a multi-color image by combination of plural colors, the rotation of the transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a belt including an endless belt, an endless seamed flexible belt, an endless seamless flexible belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the paper can be by any suitable technique conventionally used in electrophotography, such as corona transfer, pressure transfer, bias transfer, and combinations of those transfer means, and the like.

The intermediate transfer member 2 can be of any suitable configuration. Examples of suitable configurations include a sheet, a film, a web, a foil, a strip, a coil, a cylinder, a drum, an endless strip, a circular disc, a drelt (a cross between a drum and a belt), a belt including an endless belt, an endless seamed flexible belt, and an endless seamed flexible imaging belt.

A belt is one embodiment of intermediate transfer member. Certain intermediate transfer members are in the form of seamless belts. These intermediate transfer belts (ITBs) are costly to manufacture. Disclosed is a method to recondition or remanufacture seamless ITBs. The reconditioned or remanufactured belt is also described.

The method comprises obtaining a seamless intermediate transfer belt that no longer produces print of an acceptable quality. An outer layer of the intermediate transfer belt is stripped off with an alcohol. The alcohol is selected from methanol, ethanol, 1-propanol, isopropanol, 1-butanol, 2-butanol and the like and mixtures thereof. A mixture of a polymer such as fluorinated polymer, polycarbonate, polyester, polysulfone, polyethersulfone, polyphenylsulfone, polyamide, polyphenylene sulfide, phenoxy resin, polyimide, polyamideimide, or polyetherimide, conductive particles and a solvent is coated over an outer surface of the seamless intermediate transfer member. The mixture is heated to form a layer on the outer surface of the intermediate transfer belt.

For the acceptable toner transfer, both onto and off a remanufactured ITB, the final image produced across the remanufactured ITB must be comparable in quality to images formed across the original belt. Transfer fields are very sensitive to the resistivity and thickness of the materials used to overcoat the belt. To successfully function, the electrical properties of the remanufactured ITB should be carefully controlled. Overcoat thickness, uniformity, resistivity and adhesion are some of the key parameters to be controlled.

Suitable polyimides for the overcoat layer include those formed from various diamines and dianhydrides, polyamideimide, and polyetherimide. For example, polyimides that include aromatic polyimides such as those formed by the reacting pyromellitic acid and diaminodiphenylether are sold under the tradename KAPTON®-type-HN, available from DuPont. Another suitable polyimide available from DuPont and sold as KAPTON®-Type-FPC-E, is produced by imidization of copolymeric acids such as biphenyltetracarboxylic acid and pyromellitic acid with two aromatic diamines such as p-phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy)phenoxy]-hexafluoropropane available as EYMYD type L-20N from Ethyl Corporation, Baton Rouge, La. Other suitable aromatic polyimides include those containing 1,2,1',2'-biphenyltetracarboximide and para-phenylene groups such as UPILEX®-S available from Uniglobe Kisco, Inc., White Planes, N.Y., and those having biphenyltetracarboximide functionality with diphenylether end spacer characterizations such as UPILEX®-R also available from Uniglobe Kisco, Inc. Mixtures of polyimides can also be used. More commercial polyimide examples that can be used as the substrate layer 50 include PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.

Other Examples of polyimides include in the overcoat layer are KAPTON® KJ, commercially available from E.I. DuPont, Wilmington, Del., as represented by

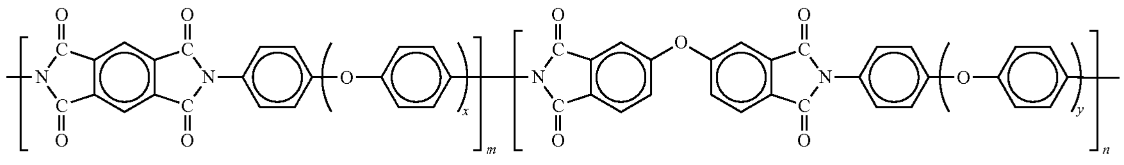

wherein x is equal to 2; y is equal to 2; m and n are the same or different and are from about 10 to about 300; IMIDEX®, commercially available from West Lake Plastic Company, as represented by

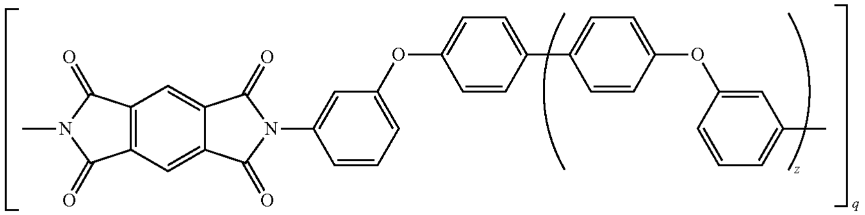

wherein z is equal to 1, and q is from about 10 to about 300; and EXTEM® XH-1005, commercially available from Sabic Innovative Plastics, as represented by

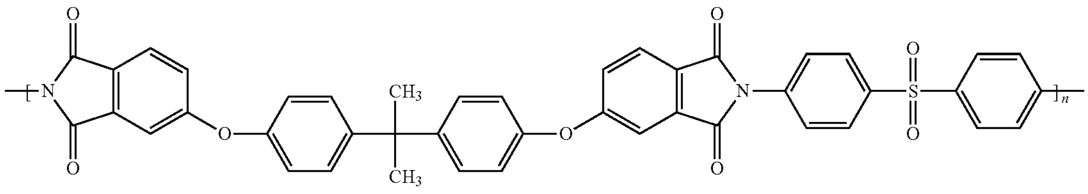

wherein n is from about 10 to about 1,000.

Examples of polyamideimides that can be utilized as overcoat layers are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Examples of polyetherimide overcoat layers are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Examples of polyamide polymers as the overcoat layer include aliphatic polyamides such as Nylon 6 and Nylon 66 from DuPont; semi aromatic polyamides, or polyphthalamides such as TROGAMID® 6T from Evonik Industries; and aromatic polyamides, or aramides such as KEVLAR® and NOMEX® from DuPont, and TEIJINCONEX®, TWARON® and TECHNORA® from Teijin.

Examples of phenoxy resin overcoat layers are represented by

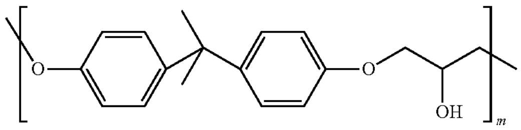

wherein m is from about 40 to about 400 or from about 70 to about 350 or from about 100 to about 400. The phenoxy resin is formed from reacting a diphenol with epichlorohydrin. In embodiments, polymers of bisphenol A and epichlorohydrin are included. Other polymers of diphenol and epichlorohydrin can also be included such as polymers of bisphenol Z and epichlorohydrin, polymers of bisphenol AF and epichlorohydrin, polymers of bisphenol C and epichlorohydrin, polymers of bisphenol S and epichlorohydrin, and polymers of bisphenol BP and epichlorohydrin. Commercial phenoxy resins are available from InChem Corp., Rock Hill, S.C. including PKFE ($M_n$=16,000 and $M_w$=60,000), PKHB ($M_n$=9,500 and $M_w$=32,000), PKHC ($M_n$=11,000 and $M_w$=43,000), PKHH ($M_n$=13,000 and $M_w$=52,000), PKHJ ($M_n$=16,000 and $M_w$=57,000), and PKHP ($M_n$=13,000 and $M_w$=52,000).

Examples of polyester polymers as the overcoat layer include aliphatic polyesters such as polyglycolic acid, polylactic acid and polycaprolactone; aliphatic copolyesters such as polyethylene adipate and polyhydroxyalkanoate; semi aromatic copolyesters such as polyethylene terephthalate (PET), polybutylene terephthalate (PBT), polytrimethylene terephthalate (PTT), and polyethylene naphthalate (PEN); aromatic copolyesters such as VECTRAN®.

Polysulfones, polyphenylsulfones and polyethersulfones selected for the overcoat layer disclosed herein are represented in embodiments for by for example

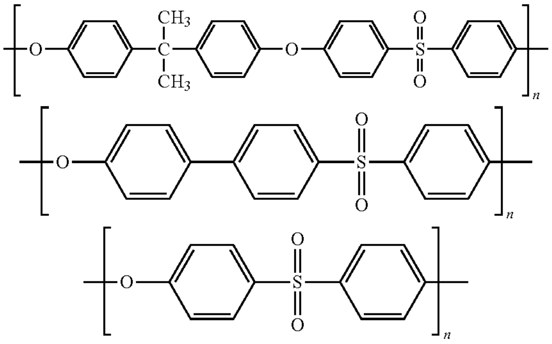

where n represents the number of repeating units, and more specifically where n is for example, a number of from about 30 to about 5,000, from about 80 to about 3,500, from about 150 to about 3,000, and yet more specifically from about 200 to about 2,000. Commercially obtainable polysulfone examples include UDEL® P-1700, P-3500; commercially obtainable polyphenylsulfone examples include RADEL® 5000NT, 5100NT15, 5900NT; commercially obtainable polyethersulfone examples include RADEL® A-200A, AG-210NT, AG-320NT, VERADEL® 3000P, 3100P, 3200P, all available or obtainable from Solvay Advanced Polymers, LLC, Alpharetta, Ga. In an embodiment the number average molecular weight of each of the polysulfone, the polyphenylsulfone and the polyethersulfone is for example, from about 2,000 to about 50,000, or from about 4,000 to about 20,000, and the weight average molecular weight of the polysulfones, the polyphenylsulfones and the polyethersulfones are for example from about 10,000 to about 200,000, or from about 50,000 to about 150,000.

Examples of polyphenylene sulfide polymers as the overcoat layer include RYTON® polyphenylene sulfide by Chevron Phillips as cross-linked type of polymer, FORTRON® polyphenylene sulfide by Ticona as a linear polymer; and SULFAR® polyphenylene sulfide by Testori.

Examples of polycarbonate polymers as the overcoat layer that are selected include poly(4,4'-isopropylidene-diphenylene)carbonate (also referred to as bisphenol-A-polycarbonate), poly(4,4'-cyclohexylidine diphenylene)carbonate (also referred to as bisphenol-Z-polycarbonate), poly(4,4'-isopropylidene-3,3'-dimethyl-diphenyl)carbonate (also referred to as bisphenol-C-polycarbonate), and the like. In embodiments, the thermoplastic polymers are comprised of bisphenol-A-polycarbonate resins, commercially available as MAKROLON®, with a weight average molecular weight of from about 50,000 to about 500,000.

Suitable fluorinated polymer overcoat layers include polyvinylidene fluoride (PVDF), and commercial examples of PVDF are under the trade names of KYNAR®, HYLAR®, SOLEF®, or SYGEF®. KYNAR® PVDF examples include KYNAR® 500, 370, 460, 201, 301-F, 711, or 721, and KYNAR FLEX® PVDF examples include KYNAR FLEX ® 2500, 2850 or 3120, all available from Arkema Inc., Philadelphia, Pa.

Other fluorinated polymers that can be used as overcoat layers include TEFLON®-like materials including fluorinated ethylene propylene copolymer (FEP), polytetrafluoroethylene (PTFE), polyfluoroalkoxy polytetrafluoroethylene (PFA TEFLON ®) and other TEFLON®-like materials; and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430® VITON B910® VITON GH®, VITON B50® VITON E45 and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomer can be those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers.

Flow coating requires the coating to be applied to a rotating substrate and applying the coating from an applicator to the substrate in a controlled amount so that substantially all the coating that exits the applicator adheres to the substrate. Specifically, only materials that can be completely dissolved in a solvent can be flow coated. Further, it is desirable that the material have the ability to stay dissolved during the entire flow coating process. Good results are not obtained with materials which tend to coagulate or crystallize within the time period required for flow coating.

An overcoat composition comprising a polymer such as fluorinated polymer such as PVDF, polycarbonate, polyester, polysulfone, polyethersulfone, polyphenylsulfone, polyamide, polyphenylene sulfide, phenoxy resin, polyimide, polyamideimide, or polyetherimide, conductive particles and a solvent is flow coated on a seamless intermediate transfer belt that no longer produces acceptable prints. PVDF is a specialty plastic material in the fluoropolymer family, generally used in applications requiring high purity, strength, and resistance to solvents, acids, bases and heat. The coating is dried and the remanufactured seamless ITB is suitable for use.

Figure 2:
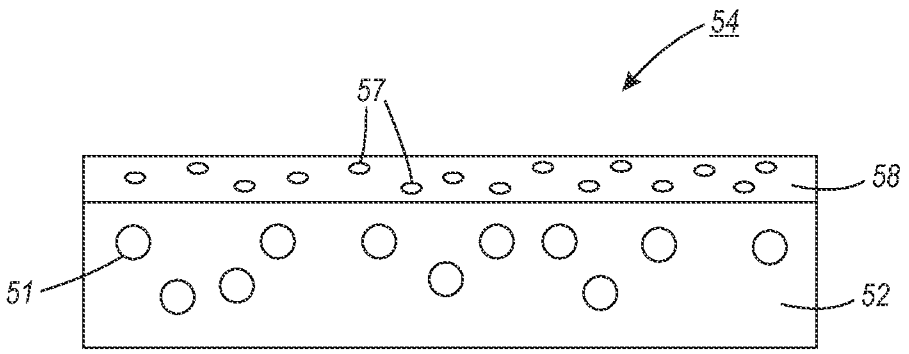
FIG. 2 is a schematic representation of an embodiment disclosed herein.

In an embodiment of a remanufactured intermediate transfer belt 54 shown in FIG. 2, the intermediate transfer belt 54 is seamless belt comprised of a polymer 52 and conductive particles 51. The initial belt no longer meets operating specifications. The seamless ITB has been remanufactured to include a surface layer 56 to restore the belt so that it operates within desired specifications. The surface layer includes a polymer 58 and conductive particles 57. The surface layer 56 provides electrical properties that are within the specification of the original seamless ITB. FIG. 2 is not to scale. The surface layer 56 has a thickness of from about 10 microns to about 150 microns, or from about 15 micron to about 120 microns, or from about 20 micron to about 100 microns.

Examples of conductive particles 57 used in the coating and surface layer 56 of remanufactured seamless ITBs include carbon blacks such as carbon black, graphite, acetylene black, fluorinated carbon black, and the like; metal oxides and doped metal oxides, such as tin oxide, antimony dioxide, antimony-doped tin oxide, titanium dioxide, indium oxide, zinc oxide, indium oxide, indium-doped tin trioxide, and polymers such as polyaniline and polythiophene, and mixtures thereof. The conductive particles 57 may be present in an amount of from about 0.1 parts by weight to about 50 parts by weight and or from about 3 parts by weight to about 40 parts by weight, or from about 5 parts by weight to about 20 parts by weight of the total solids of the surface layer 56. The surface resistivity of the remanufactured or reconditioned ITB is from about $10^9$ ohms/square to about $10^{13}$ ohms/square, or from about $10^{10}$ ohms/square to about $10^{12}$ ohms/square. The volume resistivity of the remanufactured or reconditioned ITB is from about $10^8$ ohm-cm to about $10^{12}$ ohm-cm, or from about $10^9$ ohm-cm to about $10^{11}$ ohm-cm. Both the volume and surface resistivity can be provided by varying the concentration of the conductive particles 57 in the surface layer 56 to match the initial values of the ITB.

Examples of carbon blacks selected as the conductive component for the coating and surface layer 56 include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 $m^2$/g, DBP absorption=1.05 ml/g), BLACK PEARLS® 880 (B.E.T. surface area=240 $m^2$/g, DBP absorption=1.06 ml/g), BLACK PEARLS® 800 (B.E.T. surface area=230 $m^2$/g, DBP absorption=0.68 ml/g), BLACK PEARLS® L (B.E.T. surface area=138 $m^2$/g, DBP absorption=0.61 ml/g), BLACK PEARLS® 570 (B.E.T. surface area=110 $m^2$/g, DBP absorption=1.14 ml/g), BLACK PEARLS® 170 (B.E.T. surface area=35 $m^2$/g, DBP absorption=1.22 ml/g), VULCAN® XC72 (B.E.T. surface area=254 $m^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 $m^2$/g, DBP absorption=0.59 ml/g), REGAL® 400 (B.E.T. surface area=96 $m^2$/g, DBP absorption=0.69 ml/g), REGAL® 330 (B.E.T. surface area=94 $m^2$/g, DBP absorption=0.71 ml/g), MONARCH® 880 (B.E.T. surface area=220 $m^2$/g, DBP absorption=1.05 ml/g, primary particle diameter=16 nanometers), and MONARCH® 1000 (B.E.T. surface area=343 $m^2$/g, DBP absorption=1.05 ml/g, primary particle diameter=16 nanometers); Channel carbon blacks available from Evonik-Degussa; Special Black 4 (B.E.T. surface area=180 $m^2$/g, DBP absorption=1.8 ml/g, primary particle diameter=25 nanometers), Special Black 5 (B.E.T. surface area=240 $m^2$/g, DBP absorption=1.41 ml/g, primary particle diameter=20 nanometers), Color Black FW1 (B.E.T. surface area=320 $m^2$/g, DBP absorption=2.89 ml/g, primary particle diameter=13 nanometers), Color Black FW2 (B.E.T. surface area=460 $m^2$/g, DBP absorption=4.82 ml/g, primary particle diameter=13 nanometers), and Color Black FW200 (B.E.T. surface area=460 $m^2$/g, DBP absorption=4.6 ml/g, primary particle diameter=13 nanometers).

Further examples of conductive particles 57 for the coating and surface layer 56 include doped metal oxides. Doped metal oxides include antimony doped tin oxide, aluminum doped zinc oxide, antimony doped titanium dioxide, similar doped metal oxides, and mixtures thereof.

Suitable antimony doped tin oxides include those antimony doped tin oxides coated on an inert core particle (e.g., ZELEC®ECP-S, M and T) and those antimony doped tin oxides without a core particle (e.g., ZELEC®ECP-3005-XC and ZELEC®ECP-3010-XC, ZELEC® is a trademark of DuPont Chemicals Jackson Laboratories, Deepwater, N.J.). The core particle may be mica, $TiO_2$ or acicular particles having a hollow or a solid core.

In another embodiment, the electrically conductive particles 57 for the coating and surface layer 56 include antimony doped tin oxide coated on an inert core particle (e.g., ZELEC® ECP-S, M and T). ZELEC® is a trademark of DuPont Chemicals Jackson Laboratories, Deepwater, N.J. The core particle may be mica, $TiO_2$ or acicular particles having a hollow or a solid core.

In another embodiment, antimony doped tin oxide particles are prepared by densely layering a thin layer of antimony doped tin oxide onto the surface of a silica shell or silica-based particle, wherein the shell, in turn, has been deposited onto a core particle. The crystallites of the conductor are dispersed in such a fashion so as to form a dense conductive surface on the silica layer. This provides optimal conductivity. Also, the particles are fine enough in size to provide adequate transparency. The silica may either be a hollow shell or layered on the surface of an inert core, forming a solid structure. Forms of antimony doped tin oxide are commercially available under the tradename ZELEC® ECP (electroconductive powders) from DuPont Chemicals Jackson Laboratories, Deepwater, N.J. Specific examples include antimony doped tin oxides are ZELEC® ECP 1610-S, ZELEC® ECP 2610-S, ZELEC® ECP 3610-S, ZELEC® ECP 1703-S, ZELEC® ECP 2703-S, ZELEC® ECP 1410-M, ZELEC® ECP 3005-XC, ZELEC® ECP 3010-XC, ZELEC® ECP 1410-T, ZELEC® ECP 3410-T, ZELEC® ECP-S-X1, and the like. Three commercial grades of ZELEC® ECP powders can be used and include an acicular, hollow shell product (ZELEC® ECP-S), an equiaxial titanium dioxide core product (ZELEC ECP-T), and a plate shaped mica core product (ZELEC® ECP-M).

Examples of the solvent used in the coating for the surface layer 56 include N,N-dimethylformamide, N-methylpyrrolidone, tetrahydrofuran, alcohols, toluene, hexane, cyclohexane, heptane, monoclorobenzene, N,N'-dimethylacetamide, methylene chloride, alcohols and mixtures thereof. The coating of fluorinated polymer such as PVDF, polycarbonate, polyester, polysulfone, polyethersulfone, polyphenylsulfone, polyamide, polyphenylene sulfide, phenoxy resin, polyimide, polyamideimide, or polyetherimide, conductive particles and solvent, is applied to an intermediate transfer belt producing prints of unacceptable quality. The coating is dried to restore the seamless intermediate transfer belt so that it operates within specification and produces prints of an acceptable quality.

Typical techniques for coating the composition on the intermediate transfer belt include flow coating, liquid spray coating, dip coating, wire would rod coating, fluidized bed coating, blade coating and the like. The coating is dried at temperatures of from about 25° C. to about 370° C., or from about 80° C. to about 250° C. for periods of from about 30 minutes to about 360 minutes, or from about 60 minutes to about 180 minutes to form the surface layer. The heat can be provided by thermal ovens or IR radiation devices.

Figure 3:
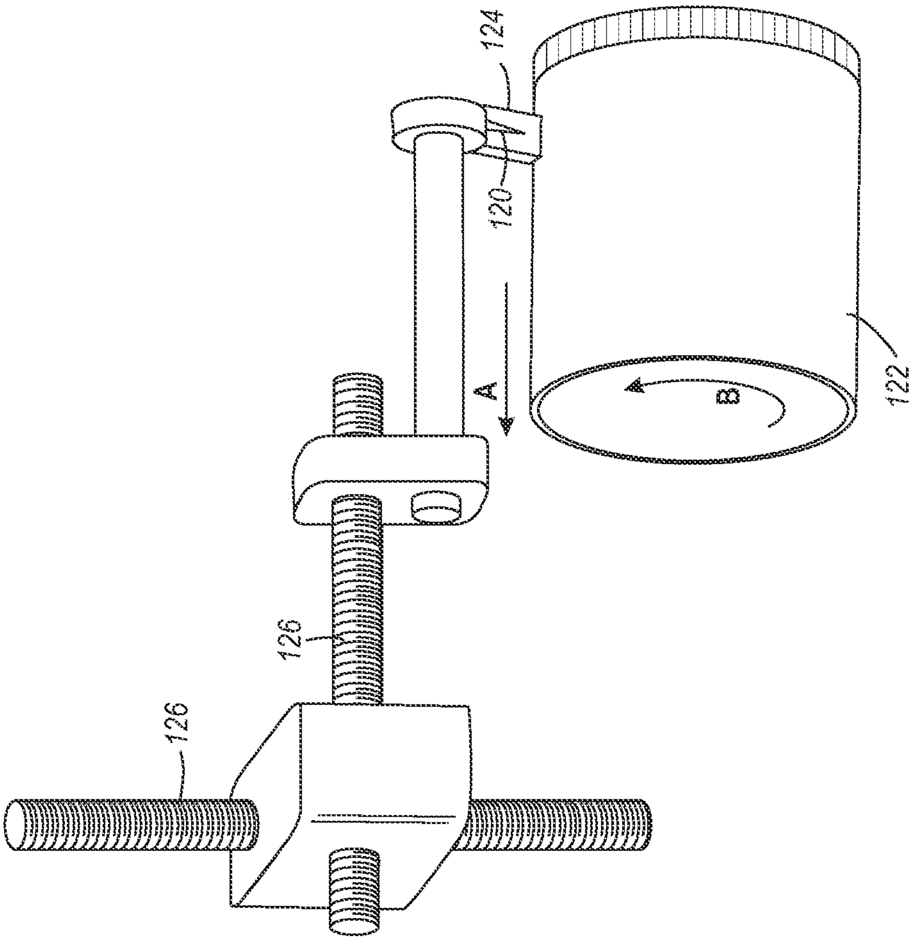
FIG. 3 is a schematic representation of an apparatus suitable for reconditioning a seamless intermediate transfer member.

In an embodiment shown in FIG. 3 showing a flow coating apparatus for reconditioning an intermediate transfer member, the overcoat composition is pumped from a dispense tank (not shown) to a dispensing needle 120 (brush, slot die or other dispensing member). The belt 122 to be remanufactured is held in place and rotated during the coating operation. The belt 122 can be rotated by various mechanisms for example, a drive roller, a tensioning roller and a trailing roller to drive. As the belt 122 is rotated at a predetermined rotational velocity, the dispensing needle 120 traverses the belt 122 in the direction of arrow A at a corresponding linear velocity to completely and uniformly coat the belt. The solvent in the overcoat can be flashed off to completely dry the coating. A doctor blade 124 smoothes the coating. The dispensing needle 120 and doctor blade 124 are positioned in relation to the belt 122 through an X-Y slide mechanism 126. After the coating is applied it is dried. By this process, it is possible to remanufacture a belt with a coating that matches the electrical properties of the ITB. The rotating speed is not critical, but can be selected from a broad range, such as from about 10 rpm to about 500 rpm, or from about 20 rpm to about 200 rpm, or from about 30 rpm to about 80 rpm.

Examples of specific seamless intermediate transfer belts that can be remanufactured include those made of polymers selected from the group consisting of polyimides, polyamides, polyamideimides, polyetherimides, polycarbonates, polysulfones, polyethersulfones, polyphenylsulfones, polyesters, polyphenylene sulfides and mixtures thereof.

Specific embodiments will now be described in detail. These examples are intended to be illustrative, and not limited to the materials, conditions, or process parameters set forth in these embodiments. All parts are percentages by solid weight unless otherwise indicated.

EXAMPLES

A seamless polyimide ITB which produced prints of unacceptable quality was obtained. The seamless polyimide ITB had been in use in an electrophographic machine. The ITB was then cleaned with isopropanol to remove any toner residues on the surface, and then air dried. The seamless polyimide ITB was coated, via a draw bar coater, with an overcoat composed of polyvinylidene fluoride (PVDF) with carbon black. PVDF is a specialty plastic material in the fluoropolymer family, generally used in applications requiring high purity, strength, and resistance to solvents, acids, bases and heat. Compared to other fluoropolymers, it has a relatively low cost.

The details of the overcoat include forming a dispersion of 0.4 grams of an 18.7 weight percent carbon black (Special Black 4) in N-methylpyrrolidone (NMP). The dispersion was mixed with 1.5 grams of KYNAR® 301F PVDF resin in 13.5 grams of N,N'-dimethylformamide (DMF). The mixture was coated on the seamless polyimide having unacceptable print quality belt by a 2.0-mil Bird bar. The coating was dried at room temperature for 1 hour, and dried at 120° C. for one hour.

The standard peel test showed strong adhesion between the polyimide bottom layer and the PVDF surface layer (did not peel).

The surface resistivity was about $10^{10.5}$ Ω/square, compared with $10^{10.2}$ Ω/square on the uncoated areas of the original belt. Visual print quality assessment showed the print quality was equivalent to the original belt. The method described herein for reconditioning an intermediate transfer member by use of an overcoat provides added life to used and/or damaged ITBs.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art, which are also encompassed by the following claims.

What is claimed is:

1. A method for reconditioning an intermediate transfer member comprising:

stripping off an outer surface of the intermediate transfer member with an alcohol;

coating a mixture of polymer, conductive particles and a solvent over the outer surface of a seamless intermediate transfer member; and heating the mixture to form a surface layer on the outer surface of the intermediate transfer belt.

2. The method of claim 1 wherein the alcohol is selected from methanol, ethanol, 1-propanol, isopropanol, 1-butanol, 2-butanol and the like and mixtures thereof.

3. The method of claim 1 wherein the solvent is selected from the group consisting of tetrahydrofuran, alcohols, methyl ethyl ketone, methyl isobutyl ketone, N,N'-dimethylformamide, N,N'-dimethylacetamide, N-methylpyrrolidone and methylene chloride.

4. The method of claim 1 wherein the conductive particles are selected from the group consisting of carbon black, graphite, acetylene black, fluorinated carbon black, metal oxides, doped metal oxides polyaniline, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene and mixtures thereof.

5. The method of claim 1 wherein the polymer is selected from the group consisting of fluorinated polymer, polycarbonate, polyester, polysulfone, polyethersulfone, polyphenylsulfone, polyamide, polyphenylsulfide, phenoxy resin, polyimide, polyamideimide, polyetherimide and mixtures thereof.

6. The method of claim 1 wherein the surface layer comprises a thickness of from about 10 microns to about 150 microns.

7. The method of claim 1 wherein the surface layer comprises a surface resistivity of from about $10^9$ ohms/square to about $10^{13}$ ohms/square.

8. The method of claim 1 wherein the reconditioned intermediate transfer member comprises a volume resistivity of from about $10^9$ ohm-cm to about $10^{13}$ ohm-cm.

9. The method of claim 1 wherein the seamless intermediate transfer belt comprises a polymer selected from the group consisting of polyimides, polyamides, polyamideimides, polyetherimides, polycarbonates, polysulfones, polyethersulfones, polyphenylsulfones, polyesters, polyphenylsulfides and mixtures thereof.

10. The method of claim 1 wherein the coating comprises flow coating.

11. An apparatus for reconditioning an intermediate transfer member comprising:

a drive mechanism for rotating and tensioning an intermediate transfer belt;

a flow coating dispensing member for applying to the intermediate transfer belt an overcoat solution wherein the flow coating dispensing member is movable both parallel and perpendicular to a direction of rotation of the intermediate transfer belt.

12. The apparatus of claim 11 wherein the drive mechanism comprises a drive roller.

13. The apparatus of claim 11 wherein the dispensing member is selected from the group consisting of a slot die and a brush.

14. The apparatus of claim 11 wherein the drive mechanism rotates the intermediate transfer belt at a rotational speed of from about 10 rpm to about 1500 rpm.

15. The apparatus of claim 11 wherein the flow coating solution comprises a polymer selected from the group consisting of fluorinated polymer, polycarbonate, polyester, polysulfone, polyethersulfone, polyphenylsulfone, polyamide, polyphenylene sulfide, phenoxy resin, polyimide, polyamideimide and polyetherimide, conductive particles and a solvent.

16. The apparatus of claim 11 further comprising a doctor blade to smooth the flow coating solution.

17. A method for reconditioning an intermediate transfer member comprising:

stripping off an outer layer of the intermediate transfer member with isopropanol;

flow coating a mixture of a polymer, conductive particles and a solvent over an outer surface of a seamless intermediate transfer member; and heating the mixture to form a surface layer on the outer surface of the intermediate transfer belt wherein the surface layer comprises a thickness of from about 10 microns to about 150 microns and a surface resistivity of from about $10^9$ ohms/square to about $10^{13}$ ohms/square.

18. The method of claim 17 wherein the polymer is selected from the group consisting of fluorinated polymer, polycarbonate, polyester, polysulfone, polyethersulfone, polyphenylsulfone, polyamide, polyphenylsulfide, phenoxy resin, polyimide, polyamideimide, polyetherimide and mixtures thereof.

19. The method of claim 18 wherein the surface layer comprises from about 0.1 parts by weight to about 50 parts by weight of conductive particles.

20. The method of claim 18 wherein the conductive particles comprise carbon black.

* * * * *